(12) United States Patent
Suematsu et al.

(10) Patent No.: US 10,125,888 B2
(45) Date of Patent: Nov. 13, 2018

(54) PILOT TYPE SOLENOID VALVE

(71) Applicant: CKD CORPORATION, Komaki-shi, Aichi (JP)

(72) Inventors: Osamu Suematsu, Komaki (JP); Akira Kishi, Nagoya (JP)

(73) Assignee: CKD CORPORATION, Komaki-shi (JP)

( * ) Notice: Subject to any disclaimer, the term of this patent is extended or adjusted under 35 U.S.C. 154(b) by 121 days.

(21) Appl. No.: 14/797,514

(22) Filed: Jul. 13, 2015

(65) Prior Publication Data

US 2016/0040801 A1     Feb. 11, 2016

(30) Foreign Application Priority Data

Aug. 5, 2014   (JP) .................................. 2014-159780

(51) Int. Cl.
    *F16K 31/06*      (2006.01)
    *F16K 31/40*      (2006.01)
    (Continued)

(52) U.S. Cl.
    CPC ...... *F16K 31/0655* (2013.01); *F15B 13/0405* (2013.01); *F15B 13/0839* (2013.01);
    (Continued)

(58) Field of Classification Search
    CPC ...... F16K 31/0655; F16K 7/12; F16K 27/003; F16K 31/402; F15B 13/0839; Y10T 137/87885
    (Continued)

(56) References Cited

U.S. PATENT DOCUMENTS 3,300,175 A * 1/1967 Kozel .................. F16K 31/402
                                                           251/30.05
4,516,604 A     5/1985 Taplin
               (Continued)

FOREIGN PATENT DOCUMENTS

CN          103925390 A    7/2014
DE          1 272 656 B     7/1968
               (Continued)

OTHER PUBLICATIONS

Dec. 14, 2015 extended Search Report issued in European Patent Application No. 15179571.3.
(Continued)

*Primary Examiner* — Craig J. Price
*Assistant Examiner* — Andrew J Rost
(74) *Attorney, Agent, or Firm* — Oliff PLC

(57) ABSTRACT

A pilot type solenoid valve includes a pilot valve unit and a passage block unit. The passage block unit has a rectangular parallelepiped shape including a pair of wide opposite surfaces, and four side surfaces surrounding the wide opposite surfaces. The four side surfaces include a first surface on which the pilot valve unit is attached, and a second surface formed with at least either an input port or an output port. A valve element is a diaphragm valve and arranged in parallel to the pair of wide opposite surfaces. The passage block unit includes a block body forming a valve chamber around a valve seat, and a flat cover. The flat cover includes a recess forming the back chamber of the diaphragm valve, and the flat cover has a flat cover communication path formed to provide communication between the recess and a common path of the pilot valve unit.

3 Claims, 18 Drawing Sheets

(51) Int. Cl.
    *F15B 13/08*  (2006.01)
    *F16K 27/00*  (2006.01)
    *F16K 27/02*  (2006.01)
    *F16K 7/12*   (2006.01)
    *F15B 13/04*  (2006.01)

(52) U.S. Cl.
    CPC .............. *F16K 7/12* (2013.01); *F16K 27/003* (2013.01); *F16K 27/0236* (2013.01); *F16K 31/402* (2013.01); *Y10T 137/87885* (2015.04)

(58) Field of Classification Search
    USPC ................. 251/30.01, 30.02, 30.05; 137/884
    See application file for complete search history.

(56) References Cited

U.S. PATENT DOCUMENTS

| | | | | |
|---|---|---|---|---|
| 5,975,486 | A * | 11/1999 | Dettmann | F16K 31/402 137/329.4 |
| 6,254,057 | B1 * | 7/2001 | Pubben | F16K 7/17 137/625.25 |
| 6,427,967 | B1 * | 8/2002 | Evans | F16K 31/385 251/26 |
| 7,293,580 | B2 * | 11/2007 | Veltri | F16K 27/003 137/596.15 |
| 2004/0124382 | A1 | 7/2004 | Berger | |
| 2007/0079875 | A1 | 4/2007 | Veltri | |

FOREIGN PATENT DOCUMENTS

| | | |
|---|---|---|
| DE | 38 22 830 A1 | 1/1990 |
| DE | 10 2009 017 864 A1 | 10/2010 |
| JP | S61-17785 A | 1/1986 |
| JP | 5546034 B2 | 7/2014 |

OTHER PUBLICATIONS

May 23, 2017 Office Action issued in Japanese Patent Application No. 2014-159780.
May 2, 2017 Office Action issued in Chinese Patent Application No. 201510474715.5.
Feb. 23, 2017 Office Action issued in European Patent Application No. 15179571.3.
Feb. 14, 2017 Office Action issued in Japanese Patent Application No. 2014-159780.
Apr. 13, 2018 Extended European Search Report issued in European Patent Application No. 17209985.5.

* cited by examiner

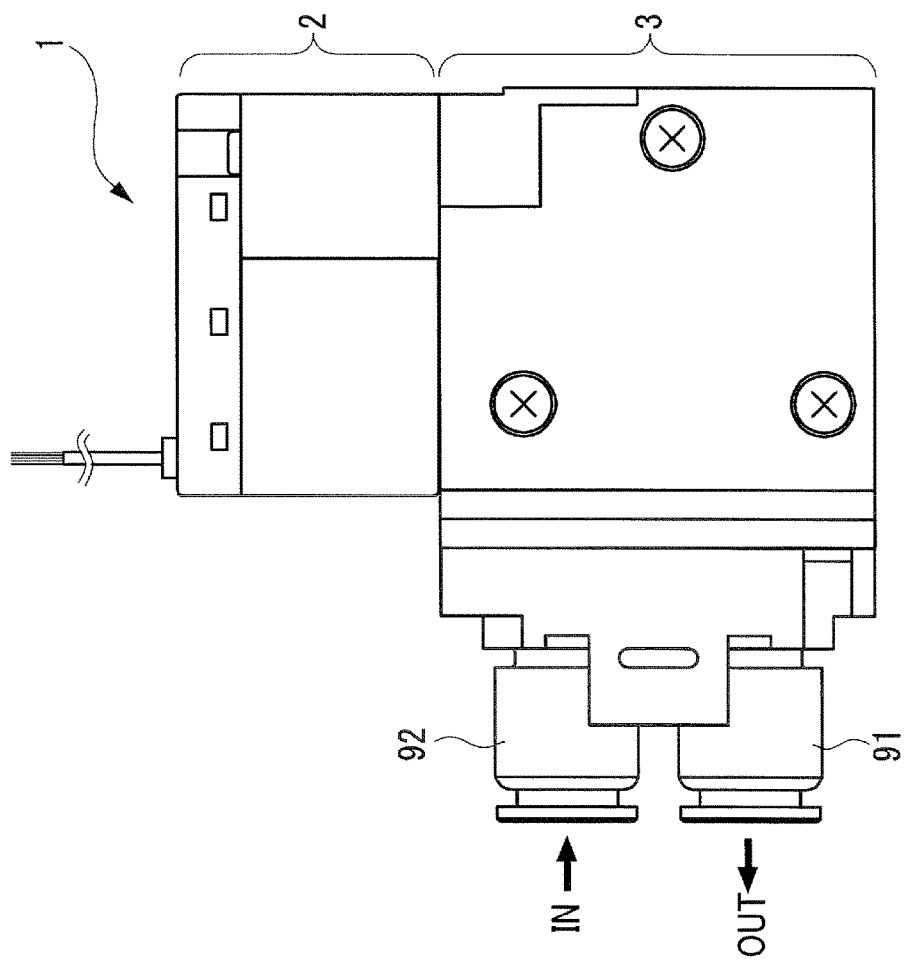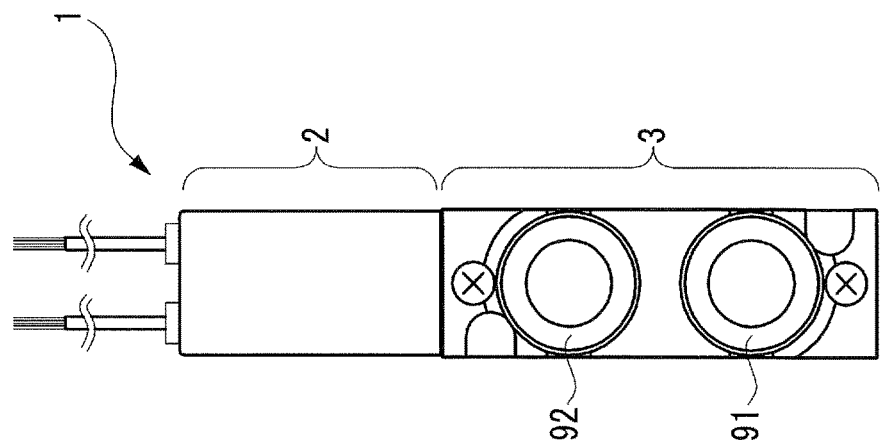

PILOT TYPE SOLENOID VALVE

CROSS-REFERENCE TO RELATED APPLICATIONS

This application is based upon and claims the benefit of priority from the prior Japanese Patent Application No. 2014-159780 filed on Aug. 5, 2014, the entire contents of which are incorporated herein by reference.

BACKGROUND OF THE INVENTION

Field of the Invention

The present invention relates to a pilot type solenoid valve including a pilot valve unit having a fixed core and a movable core, and a passage block unit formed with a valve seat which will come into or out of contact with a valve element.

Related Art

A pilot type solenoid valve for controlling fluid is used in, for example, general industrial machines such as machine tools, welding machines, fusion cutting machines, transportation machines, and air conditioning facilities.

Some of conventional pilot type solenoid valves are each provided with a diaphragm valve as a main valve element and configured to control a pressure in a back chamber of the diaphragm valve with the solenoid valve to open and close the diaphragm valve. In general, the diaphragm valve is arranged horizontally. This may require a large installation space of the pilot type solenoid valve.

In industry, there is a demand for pilot type solenoid valves each having a thickness of about 10 mm and being able to be arranged in parallel. However, such a valve is difficult to realize in practice.

On the other hand, as disclosed in Patent Document 1, the inventors of the present invention proposed that four diaphragm valve elements are arranged vertically in order to make the whole installation space compact.

RELATED ART DOCUMENTS

Patent Documents

Patent Document 1: JP-B-5546034

SUMMARY OF INVENTION

Problems to be Solved by the Invention

However, it is difficult to provide a compact pilot type solenoid valve just by applying the diaphragm arranged vertically as the Patent Document 1 to the conventional pilot type solenoid valve having the diaphragm arranged horizontally.

The reason is that, in the Patent Document 1, a main body block sandwiched between a pair of pilot type solenoid valves and a cover of the pilot type solenoid valve are provided in a large block shape allowing a passage to be easily formed therein. However, if the main body block and the cover are designed to have a total thickness of as thin as about 10 mm, it is difficult to form a passage therein because of such a thin total thickness of the main body block and the cover are thin.

The present invention has been made to solve the above problems and has a purpose to provide a compact pilot type solenoid valve with a thin thickness.

Means of Solving the Problems

To achieve the above purpose, one aspect of the invention provides a pilot type solenoid valve including: a pilot valve unit having a fixed core and a movable core, and a passage block unit formed with a valve seat with which a valve element will come into or out of contact, wherein the passage block unit has a rectangular parallelepiped shape including a pair of wide opposite surfaces and four side surfaces surrounding the wide opposite surfaces, the four side surfaces include a first surface on which the pilot valve unit is attached, and a second surface formed with at least either an input port or an output port, the valve element is a diaphragm valve and arranged in parallel to the pair of wide opposite surfaces, the passage block unit includes a block body forming a valve chamber around the valve seat, and a flat cover of a flat plate shape, the flat cover includes a recess forming a back chamber of the diaphragm valve, and the flat cover has a flat cover communication path formed to provide communication between the recess and a common port of the pilot valve unit.

According to the above configuration, the flat cover communication path is formed by the recess in the thin flat cover, so that the back chamber of the diaphragm valve and the common port of the pilot valve unit can be connected with each other. Therefore, the block body and the flat cover assembled together can have a thinner thickness, for example, about 10 mm, than conventional ones.

Moreover, the pilot type solenoid valve can be provided in a compact size and hence installed in such a space allowing installation of only a direct acting valve. Thus, this solenoid valve can be used to control high or large flow.

Further, the pilot type solenoid valve according to the invention can supply high flow at low pressure. Therefore, the entire pressure applied to the valve, which would be conventionally high, can be reduced. This can reduce the size of a pressure pump or the like, thereby enabling reduced total power consumption of the pilot type solenoid valve.

BRIEF DESCRIPTION OF THE DRAWINGS

FIGS. 12A and 12B are a front view and a right side view of a pilot type solenoid valve in a fifth embodiment of the invention;

DESCRIPTION OF EMBODIMENTS

Figure 1:
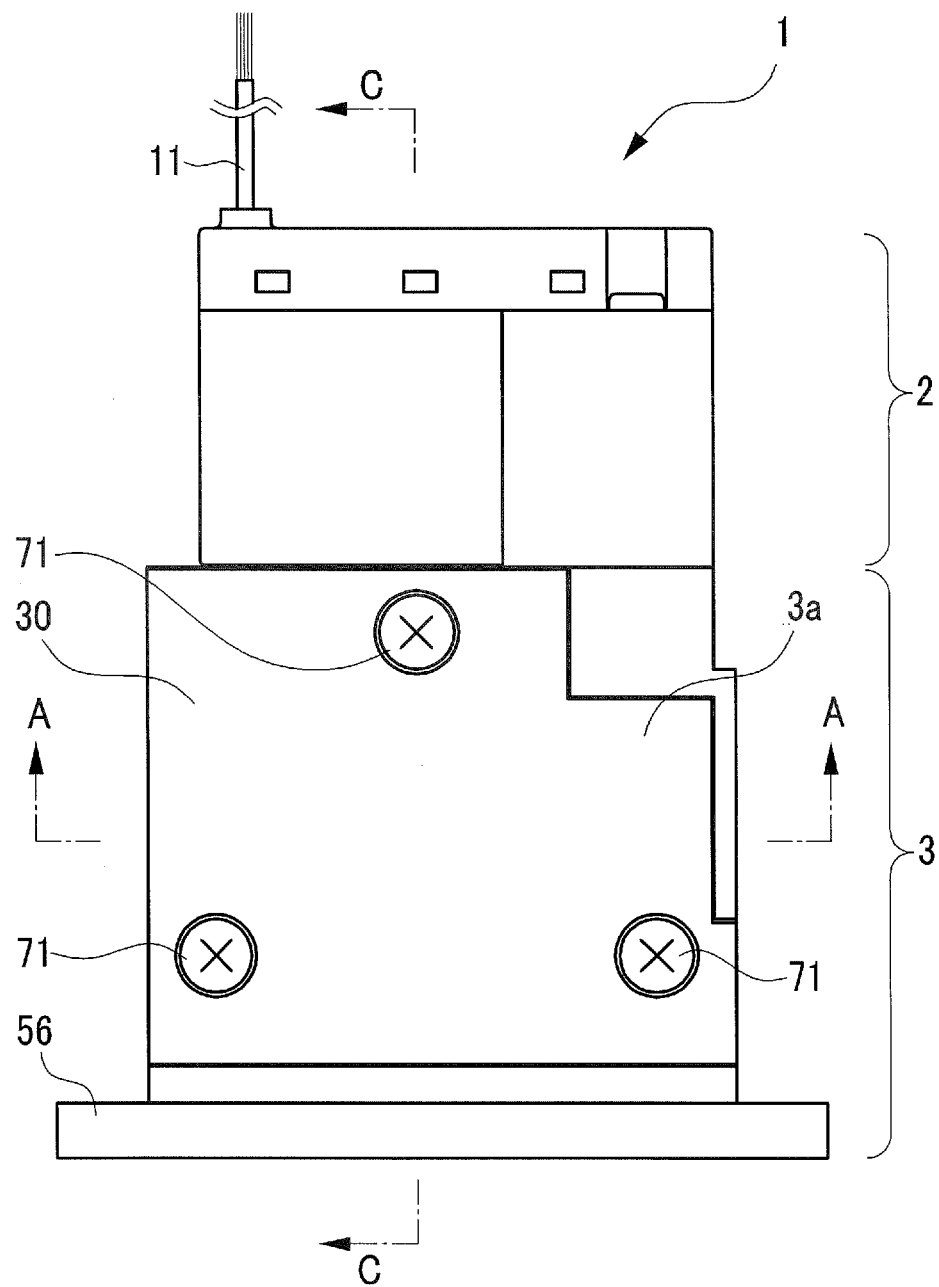
FIG. 1 is a front view of a pilot type solenoid valve in a first embodiment of the invention.
Figure 2:
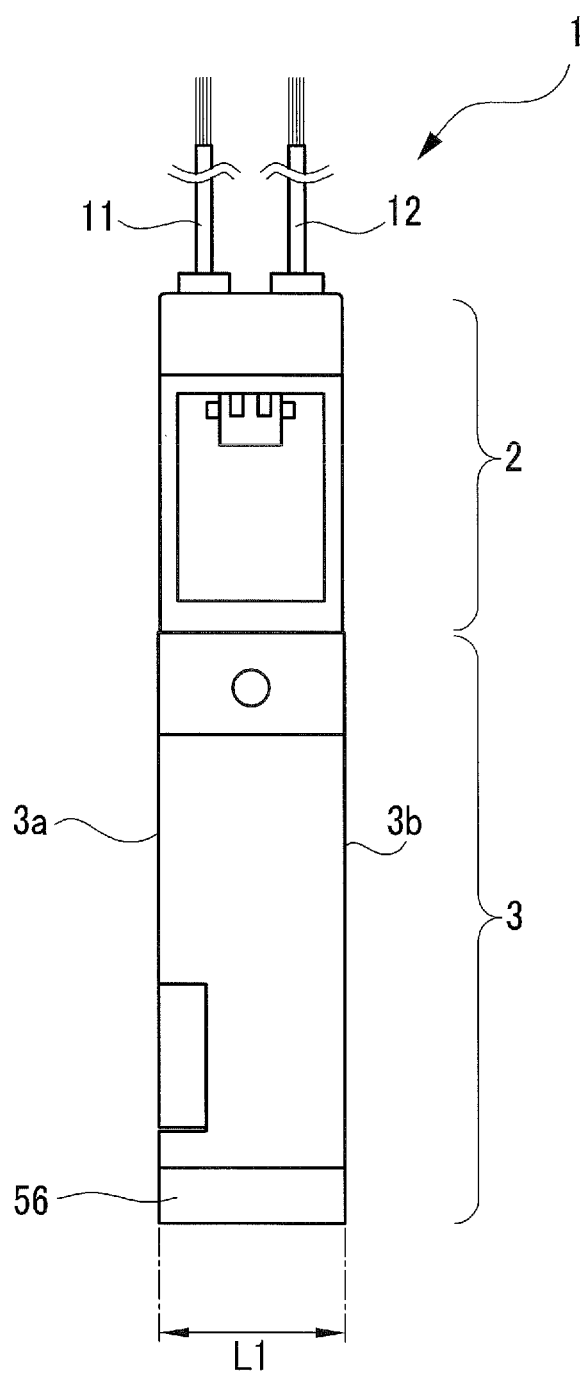
FIG. 2 is a right side view of the pilot type solenoid valve shown in FIG. 1.
Figure 3:
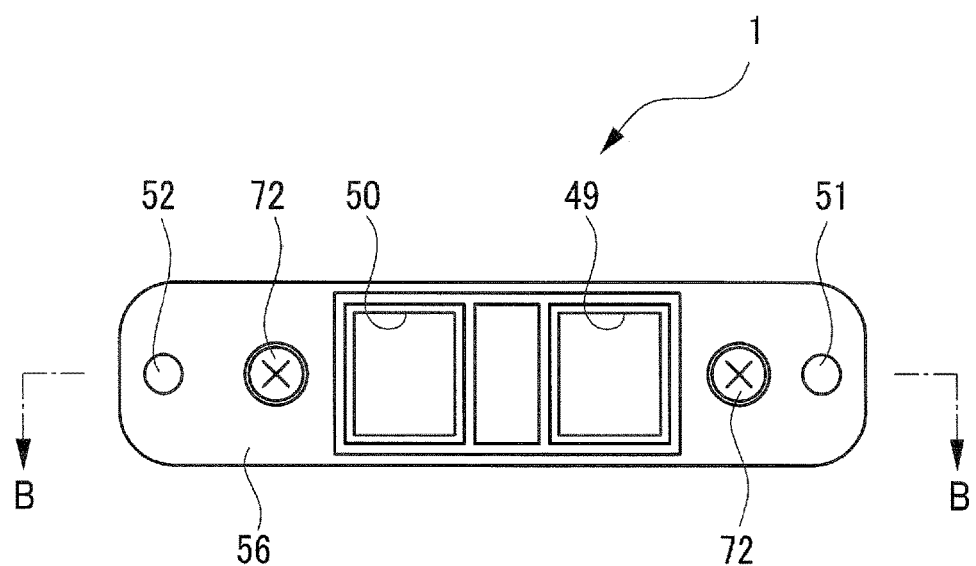
FIG. 3 is a bottom view of the pilot type solenoid valve shown in FIG. 1.
Figure 4:
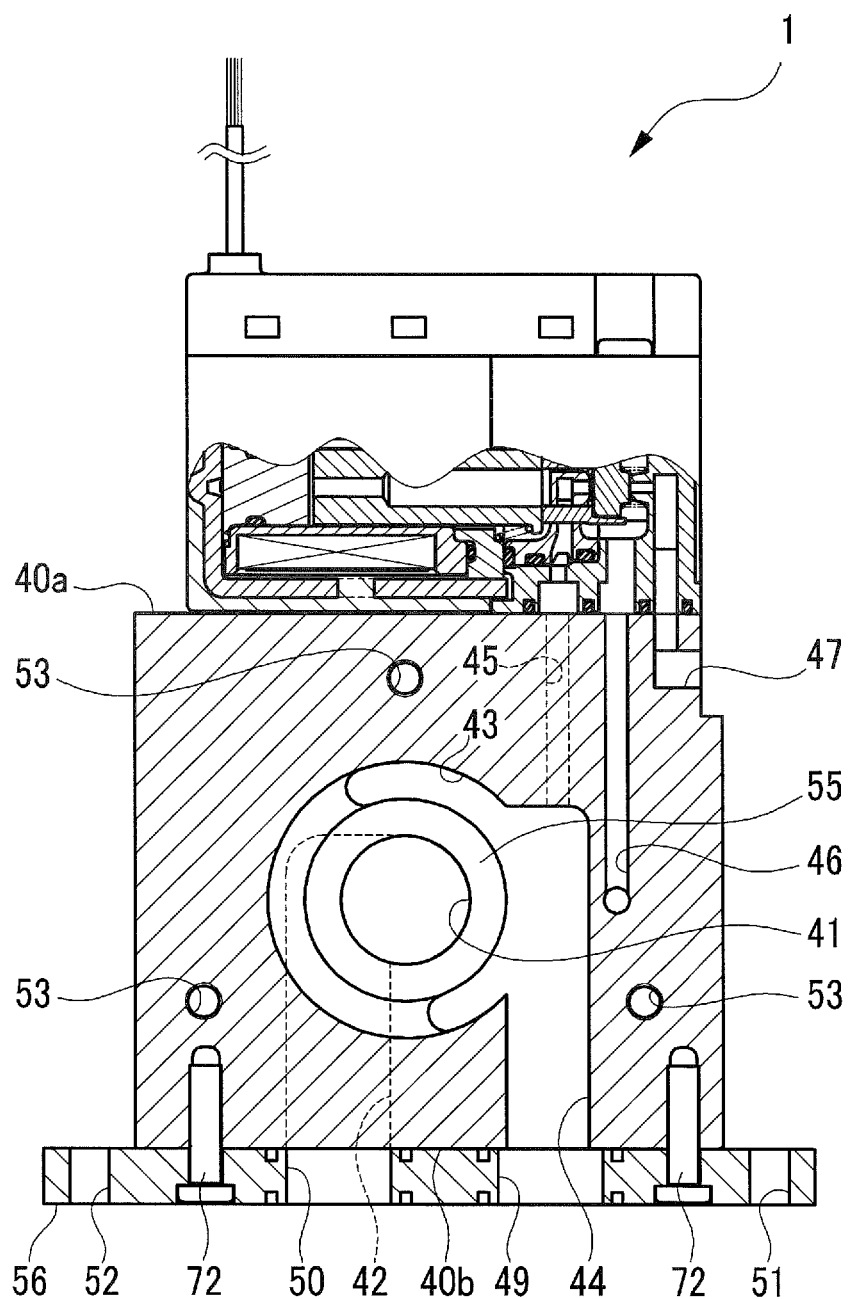
FIG. 4 is a sectional view of the pilot type solenoid valve taken along B-B in FIG. 3.
Figure 5:
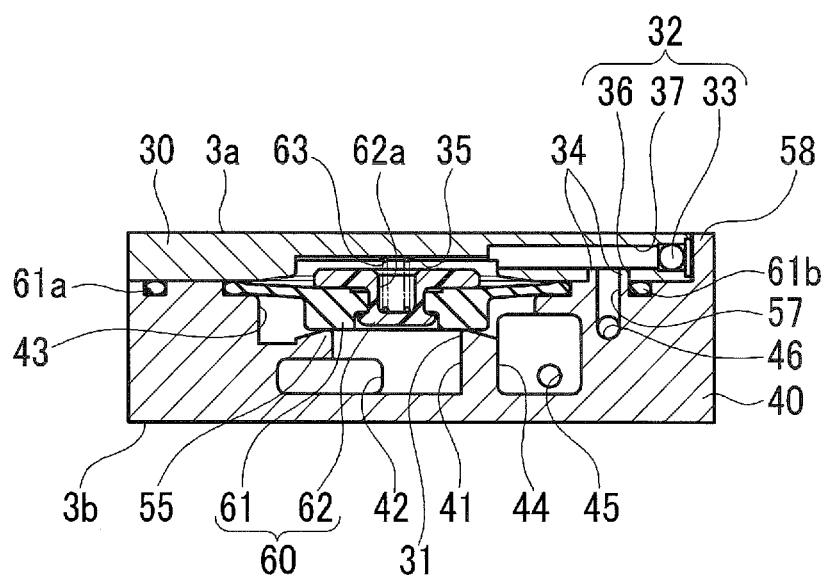
FIG. 5 is a sectional view of the pilot type solenoid valve taken along A-A in FIG. 1.
Figure 6:
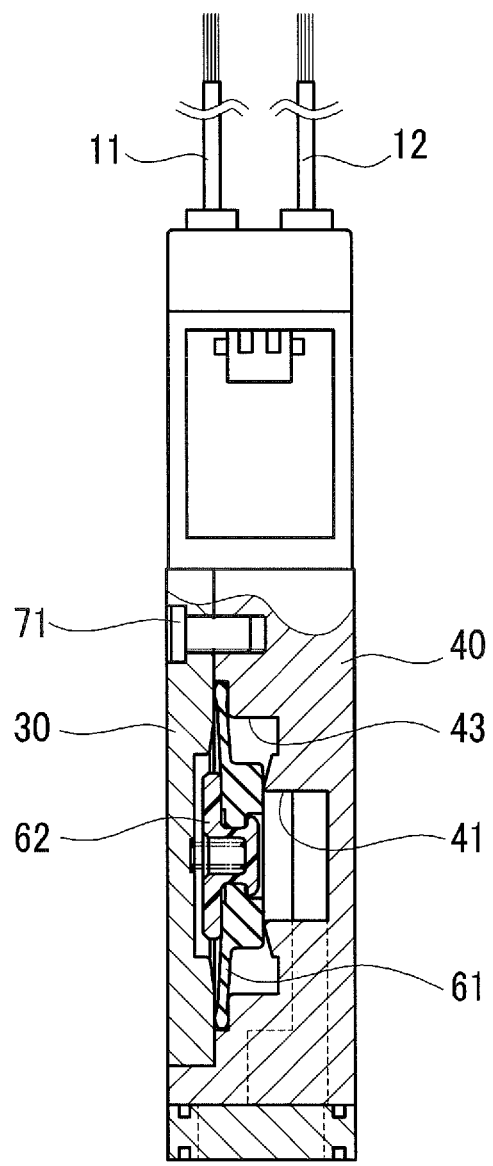
FIG. 6 is a sectional view of the pilot type solenoid valve taken along C-C in FIG. 1.

A detailed description of a preferred embodiment of a pilot type solenoid valve 1 according to the present invention will now be given referring to the accompanying drawings. FIG. 1 is a front view of the pilot type solenoid valve ("solenoid valve") 1. FIG. 2 is a right side view of the solenoid valve 1 shown in FIG. 1. FIG. 3 is a bottom view of the solenoid valve 1 shown in FIG. 1. FIG. 4 is a sectional view of the solenoid valve 1 taken along B-B in FIG. 3. FIG. 5 is a sectional view of the solenoid valve 1 taken along A-A in FIG. 1. FIG. 6 is a sectional view of the solenoid valve 1 taken along C-C in FIG. 1. As shown in FIG. 1, the pilot type solenoid valve 1 includes a pilot valve unit 2 and a passage block unit 3.

Next, explanation is given to a structure of the passage block unit 3 referring to FIGS. 4 and 5. As shown in FIG. 5, the passage block unit 3 has a rectangular parallelepiped block shape having a pair of opposite wide surfaces 3a and 3b and includes a block body 40 and a flat cover 30 attached thereto. Explanation is first given to a structure of the block body 40. The block body 40 is formed, at its center, with a valve chamber 43 formed as a recess having a nearly cylindrical shape. The pair of opposite surfaces 3a and 3b are surrounded by four side surfaces defining the thickness of the passage block unit 3 (the thickness L1 of the solenoid valve 1, see FIG. 2).

At a center bottom of the valve chamber 43, a valve seat 55 is formed. This valve seat 55 is formed at its center with a valve hole 31. This valve hole 31 has a bottom, forming a valve hole chamber 41. A left end of the bottom of the valve hole chamber 41 is communicated with an outlet passage 42 formed in a rectangular shape, as illustrated in FIG. 5. As shown in FIG. 4, one end of the outlet passage 42 opens in a lower end surface 40b of the block body 40.

As shown in FIGS. 4 and 5, a right end of the valve chamber 43 is communicated with an inlet passage 44 having a square cross-sectional shape. One end of the inlet passage 44 opens in the lower end surface 40b of the block body 40. In the other end of the inlet passage 44, one end of a NO communication path 45 opens. The other end of the NO communication path 45 opens in an upper surface 40a of the block body 40.

The lower surface 40b of the block body 40 is attached with a mounting plate 56 fixed by two screws 72. The mounting plate 56 is formed with an inlet port 49 communicated with the inlet passage 44 and an outlet port 50 communicated with the outlet passage 42. Screw holes 51, and 52 are formed in both end sides of the mounting plate 56. The pilot type solenoid valve 1 is mounted with the screw holes 51, and 52 to a manifold block formed with ports corresponding to the inlet port 49 and the outlet port 50. As shown in FIG. 4, an air passage 47 is formed to communicate an opening formed in a right upper surface and an opening formed in an upper right side surface of the block body 40.

Next, explanation is given to a structure of the flat cover 30 and an attachment structure of a diaphragm valve element 60. As shown in FIG. 5, a recess 35 is formed at the center of an inside surface of the flat cover 30 facing the block body 40. The recess 35 constitutes a back chamber of the diaphragm valve element 60.

The diaphragm valve element 60 is constituted of a disc-shaped diaphragm 61 having a thin outer peripheral portion and a thick central portion, and a resin body 62 formed in and together with a central portion of the diaphragm 61. The outer peripheral portion of the diaphragm 61 is fixedly held and sealed between the block body 40 and the flat cover 30. The diaphragm valve element 60 divides the valve chamber 43 from the recess 35. At an upper center of the resin body 62, a recess 62a is formed in which a coil spring 63 is mounted. This coil spring 63 urges the diaphragm valve element 60 in a direction to contact with the valve seat 55. FIG. 5 shows the state that the diaphragm valve element 60 is in contact with the valve seat 55. As will be mentioned later, the urging force of the coil spring 63 is not so strong, and the diaphragm valve element 60 is made contact with the valve seat 55 by resultant force of the force of compressed air supplied to the recess 35 serving as the back chamber and the force of the coil spring 63.

As shown in FIG. 5, one end (a left end in FIG. 5) of a through path 37 forming a flat cover communication path 32 opens in a side surface (partially, a bottom) of the recess 35 of the flat cover 30. The other end (a right end in FIG. 5) of the through path 37 forming the flat cover communication path 32 opens in a side surface of the flat cover 30. Specifically, the through path 37 opens in the side surface of the flat cover 30 to extend to the inner surface of the recess 35 because it is necessary to pull out a pin inserted from the side of the flat cover 30 in a mold after molding of the flat cover 30. A metal ball 33 is placed by press-fit in the through hole to block the open end in the side surface of the flat cover 30. The through path 37 blocked with the metal ball 33 press-fit therein forms the flat cover communication path 32. In the present embodiment, the flat cover 30 has a thickness of about 3 mm and the flat cover communication path 32 has a diameter of about 1 mm.

The block body 40 includes a shielding wall 58 formed at a right upper surface in FIG. 5, thereby covering an opening of the flat cover communication path 32 in which the metal ball 33 is inserted. Accordingly, even if the press-fit state of the metal ball 33 becomes loosen, the metal ball 33 does not pop out from the opening, so that the sealing property in the flat cover communication path 32 can be ensured.

A through hole 36 is formed at a portion of an inner surface of the flat cover communication path 32 in the flat cover 30. In this through hole 36, there is inserted a cylindrical protrusion 34 of the block body 40. The protrusion 34 internally has a communication path 57 which is communicated with an end of a common communication path 46 formed in the block body 40. The other end of the common communication path 46 opens in the upper surface 4a of the block body 40. The communication path 57 is sealed by a seal ring 61b which is one of two seal rings 61a and 61b formed integral with the diaphragm 61.

As shown in FIGS. 1 and 4, the flat cover 30 is secured to the block body 40 with three screws 71 screwed into screw holes 53 of the block body 40. In a state of the block body 40 and the flat cover 30 secured thereto as shown in FIG. 2, the thickness L1 of the passage block unit 3 is 10 mm in the present embodiment. Thus, the thickness of the pilot valve unit 2 is also 10 mm.

Figure 7:
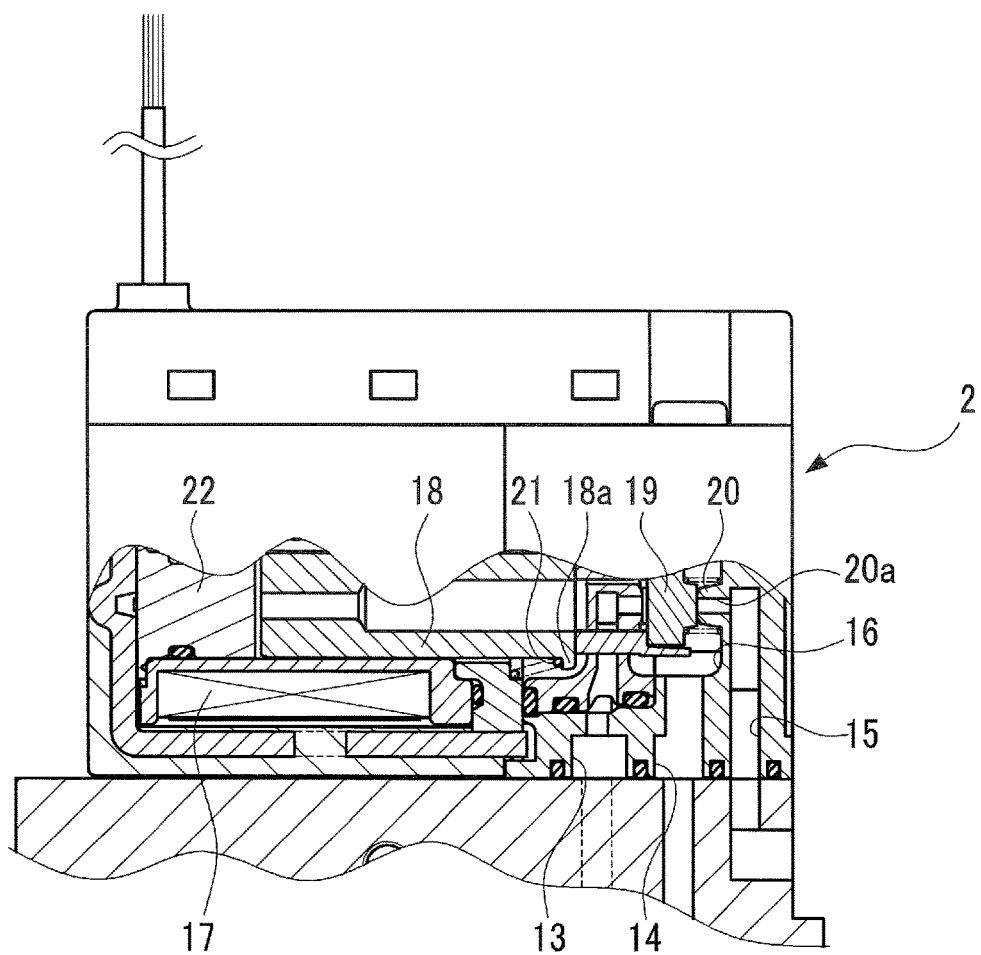
FIG. 7 is a sectional view of a pilot valve unit, showing a pilot valve closed sate.

Next, explanation is given to a structure of the pilot valve unit 2. The structure of the pilot valve unit 2 is shown in FIG. 7. FIG. 7 shows the state of the pilot valve is closed. A hollow coil 17 is arranged on a left side in the pilot valve unit 2. A fixed core 22 is fixed in the left end portion of the coil 17. In the right end portion of the coil 17, a movable core 18 is held to be movable in a linear direction (a right and left direction in FIG. 7). A right end of the movable core 18 is attached with a rubber pilot valve element 19. This pilot valve element 19 is placed to be able to contact with a valve seat 20. The valve seat 20 is formed at the top of a truncated conical projection part. The movable core 18 is formed with a flange 18a to which an urging spring 21 is attached. The urging spring 21 urges the movable core 18 in a direction to make the pilot valve element 19 contact with the valve seat 20. In FIG. 7, no electric current is supplied to the coil 17, so that the pilot valve element 19 is in contact with the valve seat 20 by the urging force of the urging spring 21.

A pilot valve chamber 16 is communicated with a common passage 14 and a NO passage 13. Specifically, the common passage 14 and the NO passage 13 are always communicated with each other. A valve hole 20a formed in the center of the valve seat 20 is communicated with a NC passage 15.

The common passage 14 of the pilot valve unit 2 is communicated with the communication path 57 through the common communication path 46 of the passage block unit 3. Similarly, the NO passage 13 is communicated with the NO communication path 45. A NC passage 15 is communicated with the air passage 47. On the other hand, two wirings 11, 12 is connected in the upper surface of the pilot valve unit 2. The two wirings 11, 12 are connected to the coil 17.

Next, operations of the pilot type solenoid valve 1 will be described. First explanation is given to a state in which the coil 17 is not energized. As shown in FIG. 7, the pilot valve element 19 is urged by the urging spring 21 and thus held in contact with the valve seat 20. Therefore, communication between the common passage 14 and the NC passage 15 is cut off.

On the other hand, the inlet passage 44 is constantly supplied with, e.g., compressed air, so that the compressed air is also supplied to the common passage 14 through the NO passage 13 and the NO communication path 45. Further, the compressed air is supplied to the recess 35 serving as a back chamber through the common communication path 46, the communication path 57, and the flat cover communication path 32.

While receiving no force of the compressed air, the diaphragm valve element 60 is placed in a position out of contact with the valve seat 55. However, the force of the coil spring 63 is not so strong as to provide a sufficient force required to close the diaphragm valve element 60 against the valve seat 55.

When the compressed air is supplied to the recess 35, the diaphragm valve element 60 receives a force in a direction to come into contact with the valve seat 55. The resultant force of this force of the compressed air and the force of the coil spring 63 gives the diaphragm valve element 60 the required closing force against the valve seat 55, so that the valve chamber 43 and the valve hole chamber 41 are cut off from each other. In this state, the pilot type solenoid valve 1 is in a closing state.

Figure 8:
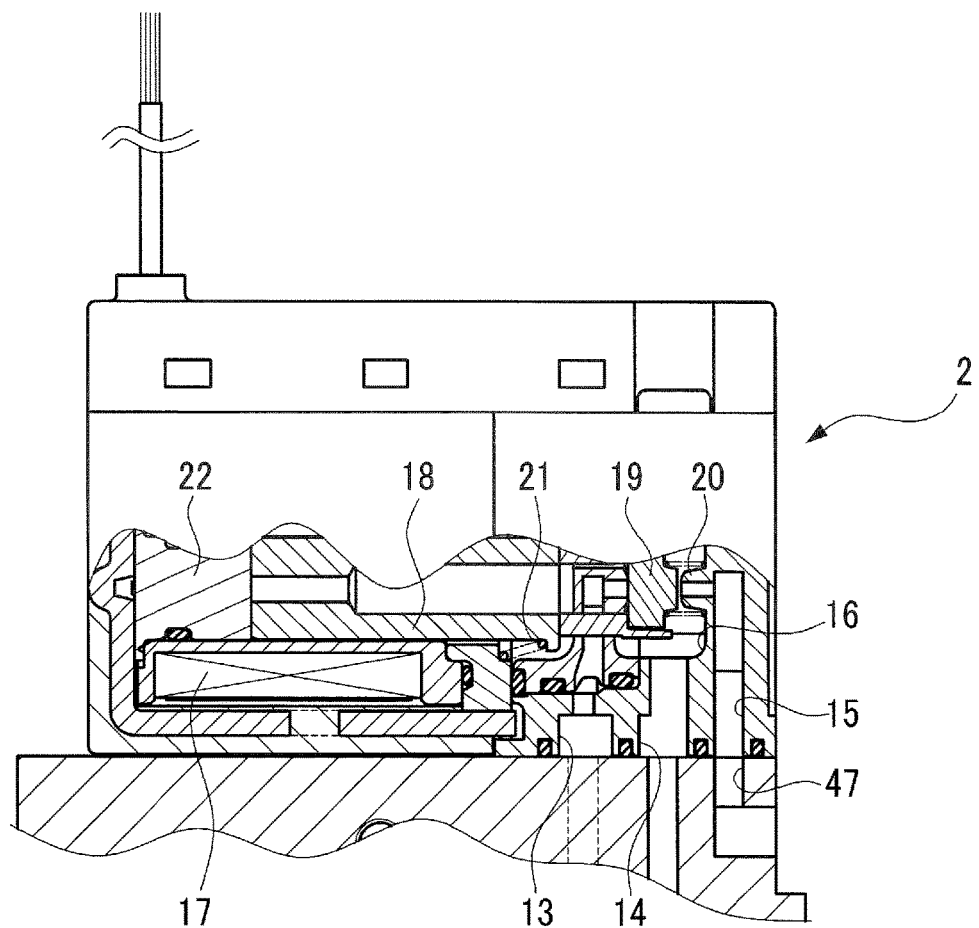
FIG. 8 is a sectional view of the pilot valve unit, showing a pilot valve opened sate.

Next, explanation is given to a state in which the coil 17 is energized. FIG. 8 shows a state in which the coil 17 is energized. As shown in FIG. 8, the movable core 18 is attracted into contact with the fixed core 22 by the magnetic force of the fixed core 22 against the urging spring 21. Accordingly, the pilot valve element 19 is moved apart from the valve seat 20. This allows communication between the common passage 14 and the NC passage 15.

On the other hand, since, e.g., the compressed air is constantly supplied to the inlet passage 44, the compressed air is also supplied to the common passage 14 through the NO passage 13 and the NO communication path 45. However, when the common passage 14 and the NC passage 15 are placed in communication with each other, the compressed air is released to atmosphere through the air passage 47 communicating with the NC passage 15 and opening to atmosphere. Thus, the air pressure of the recess 35 serving as a back chamber is instantaneously dropped.

The diaphragm valve element 60 is located in the position out of contact with the valve seat 55 while the valve element 60 does not receive a force of compressed air. However, since the force of the coil spring 63 is not so strong, the diaphragm valve element 60 cannot obtain a sufficient force required to close against the valve seat 55 by only the force of the coil spring 63.

When the compressed air is released out from the recess 35, the diaphragm valve element 60 is deformed in a direction to separate from the valve seat 55 by a restoring force of the diaphragm valve element 60 itself. This separation of the diaphragm valve element 60 from the valve seat 55 is caused by the pressure of the valve chamber 43 that is larger than the decreased pressure of the recess 35. Accordingly, the valve chamber 43 and the valve hole chamber 41 are allowed to communicate with each other. In this state, the pilot type solenoid valve 1 is in an opening state.

As mentioned above, the pilot type solenoid valve 1 in the embodiment has the following advantages.

(1) The pilot type solenoid valve 1 includes the pilot valve unit 2 having the fixed core 22 and the movable core 18, and the passage block unit 3 formed with the valve seat 55 with which the diaphragm valve element 60 will come into or out of contact. The passage block unit 3 has a rectangular parallelepiped shape including the pair of wide opposite surfaces 3a and 3b, and four side surfaces surrounding the wide opposite surfaces 3a and 3b. The four side surfaces include the first surface (the upper surface in FIG. 1) on which the pilot valve unit 2 is attached, and the second surface (the lower surface in FIG. 1) formed with at least either the input port 49 or the output port 50. The diaphragm valve element 60 is a diaphragm valve and arranged in parallel to the pair of wide opposite surfaces 3a and 3b. The passage block unit 3 includes the block body 40 forming the valve chamber 43 around the valve seat 55, and the flat cover 30 of a flat plate shape. The flat cover 30 includes the recess 35 forming the back chamber of the diaphragm valve, and the flat cover 30 has the flat cover communication path 32 formed to provide communication between the recess 35 and the common path 14 of the pilot valve unit 2. According to the above configuration, the flat cover communication path 32 is formed in the thin flat cover 30 through the use of the recess 35, so that the recess 35 of the diaphragm valve unit 2 and the common passage 14 of the pilot valve unit 2 can be connected with each other. Therefore, the total thickness of the block body 40 and the flat cover 30 attached or assembled thereto can be set as thin as about 10 mm, for example.

Moreover, the pilot type solenoid valve 1 configured in compact as above can be installed in such a space where only a direct acting valve could be placed. Thus, this solenoid valve 1 can be used for high or large flow. Further, the foregoing pilot type solenoid valve can supply high flow at low pressure. Therefore, the entire pressure applied to the valve 1, which would be conventionally high, can be reduced. This can reduce the size of a pressure pump or the like, thereby enabling reduced total power consumption of the pilot type solenoid valve 1.

(2) The flat cover communication path 32 includes the through path 37 having the open end (a right end in FIG. 5) at the side surface of the flat cover 30 to extend to the inner surface of the recess 35, the through hole 36 opening at the inner surface of the flat cover 30 to the through path 37, and the metal ball 33 placed in the through path 37 to block the open end of the through path 37. The passage block unit 3 has the shielding wall 58 covering the open end of the through path 37. According to the above configuration, the flat cover communication passage 32 can be formed surely and simply in the flat cover 30 having a thickness as thin as about 3 mm for example. Thus, the total thickness of the block body 40 and the flat cover 30 attached or assembled thereto can be set as thin as about 10 mm for example.

(3) The diaphragm valve element 60 divides the valve chamber 43 from the back chamber. The block body 40 is formed with the inlet passage 44 allowing communication between the valve chamber 43 and the inlet port 49, and the outlet passage 42 allowing communication between the valve hole 31 defined by the opening of the valve seat 55 and the outlet port 50. According to the above configuration, a necessary passage can be formed in the block body 40, so that the thickness of an assembly of the block body 40 and the flat cover 30 attached thereto can be set as thin as about 10 mm for example.

(4) The valve hole 31 forms the valve hole chamber 41 having the bottom communicated with the outlet passage 42 formed in a rectangular shape, as illustrated in FIG. 5. According to the above configuration, the block body 40 can have a thin thickness while ensuring a cross-section area of the outlet passage 42. Thus, the thickness of an assembly of the block body 40 and the flat cover 30 attached thereto can be set as thin as about 10 mm for example.

(5) The second surface is formed with the inlet port 49 and the outlet port 50. According to the above configuration, the inlet port 49 and the outlet port 50 can be positioned at the mounting surface defined by the second surface. Therefore, the installation space can be compact.

Next, a pilot type solenoid valve 1 in a second embodiment will be explained below. A structure of the pilot type solenoid valve in the second embodiment is almost the same as that in the first embodiment. Therefore, similar or identical parts or components to those in the first embodiment are assigned the same referential signs and their details are omitted. The following explanation is made with a focus on differences from the first embodiment.

Figure 9A:
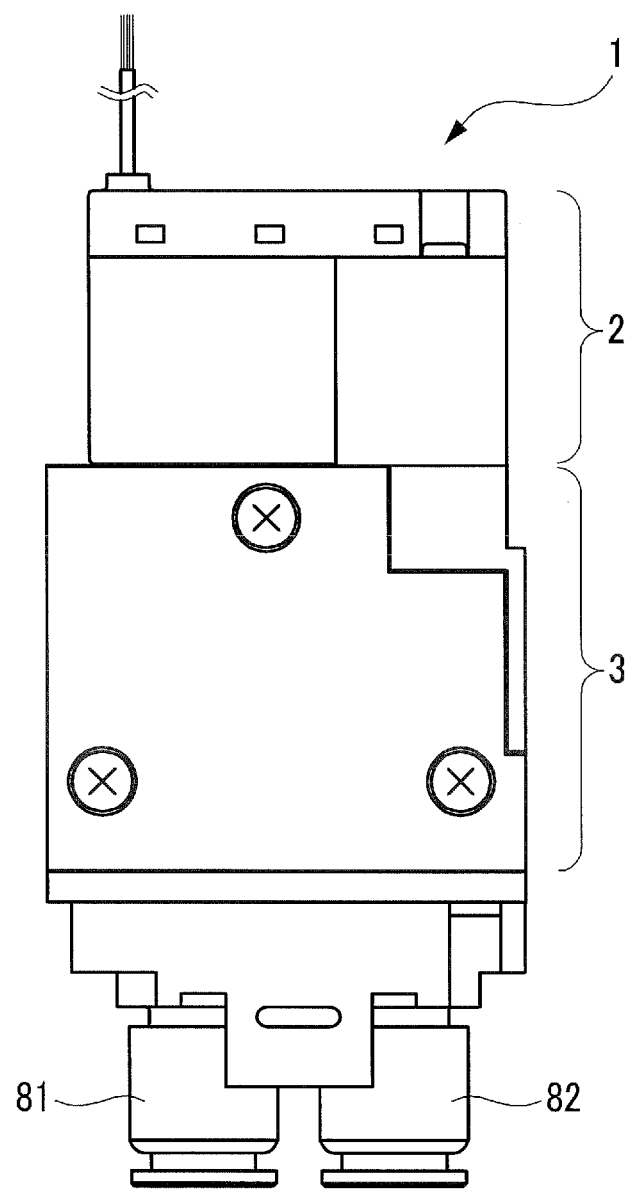
FIGS. 9A and 9B are a front view and a bottom view of a pilot type solenoid valve in a second embodiment of the invention.
Figure 9B:
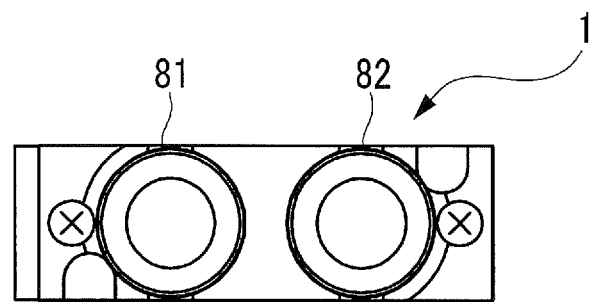

FIG. 9A is a front view of the pilot type solenoid valve 1 in the second embodiment. FIG. 9B is a bottom view of the valve 1 shown in FIG. 9A. The second embodiment is different from the first embodiment in only a connection structure of inlet and outlet ports, so only those different parts will be explained below.

In the first embodiment, the pilot type solenoid valve 1 is intended to be directly attached to a manifold block. On the other hand, in the second embodiment, one-touch joints 81 and 82 are attached to the passage block unit 3. Accordingly, users can connect the one-touch joint 81 and 82 to tubes in use.

Figure 10A:
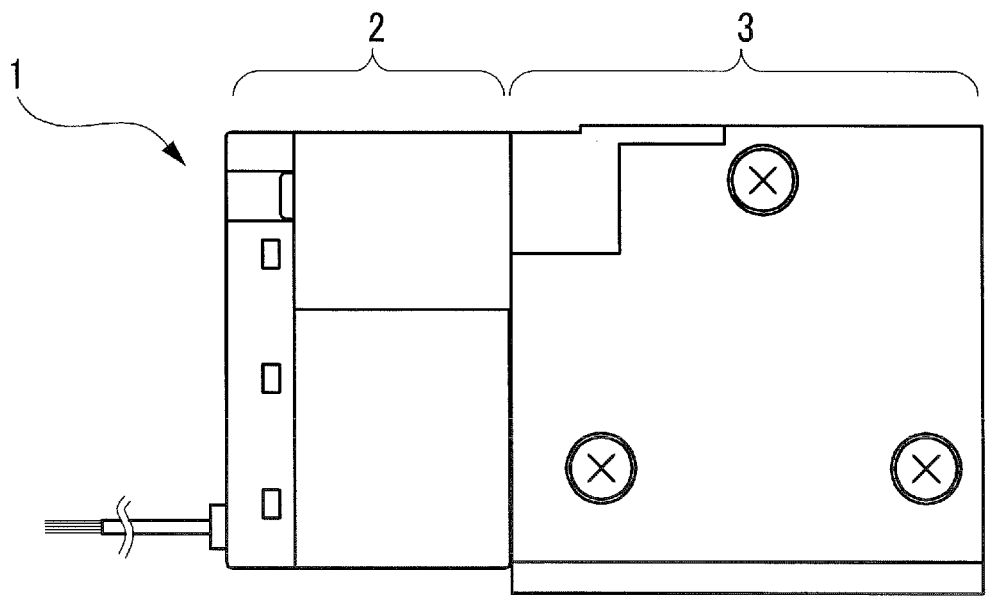
FIGS. 10A and 10B are a front view and a bottom view of a pilot type solenoid valve in a third embodiment of the invention.
Figure 10B:
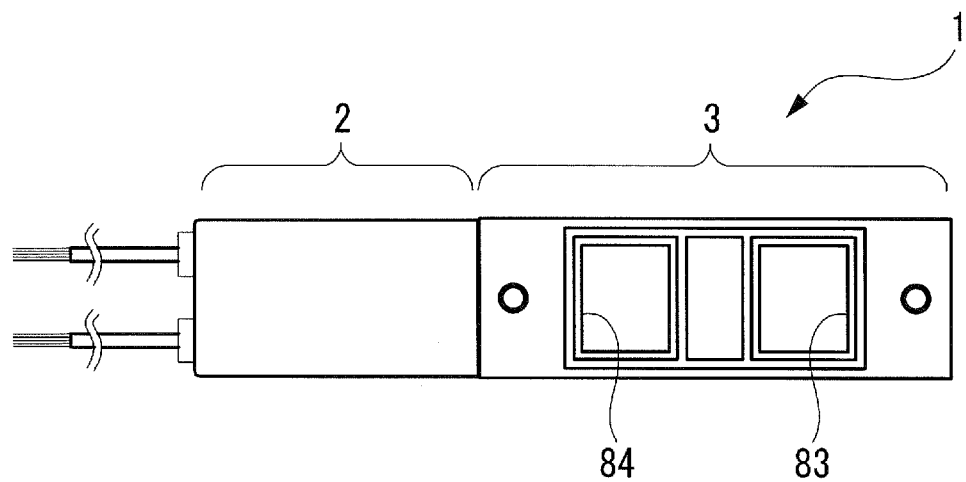

Next, a pilot type solenoid valve 1 in a third embodiment will be explained below. FIG. 10A is a front view of the pilot type solenoid valve 1 in the third embodiment. FIG. 10B is a bottom view of the valve 1 shown in FIG. 10A. The third embodiment is different from the first embodiment in only the position of inlet and outlet ports, so only those different parts will be explained below.

In the present embodiment, an inlet port 84 and an outlet port 83 are provided in a surface (a lower surface in FIG. 10A) of the passage block unit 3, perpendicular, or at a right angle, to the surface on which the pilot valve unit 2 is attached. According to this configuration, there is an advantage that the whole height including the manifold can be low.

Figure 11A:
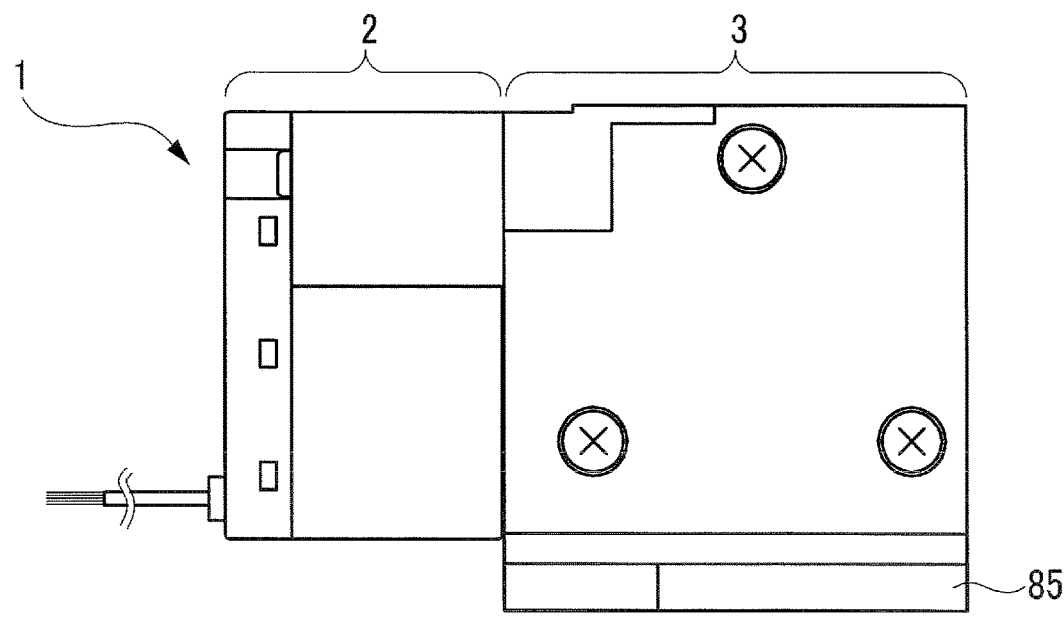
FIGS. 11A and 11B are a front view and a bottom view of a pilot type solenoid valve in a fourth embodiment of the invention.
Figure 11B:
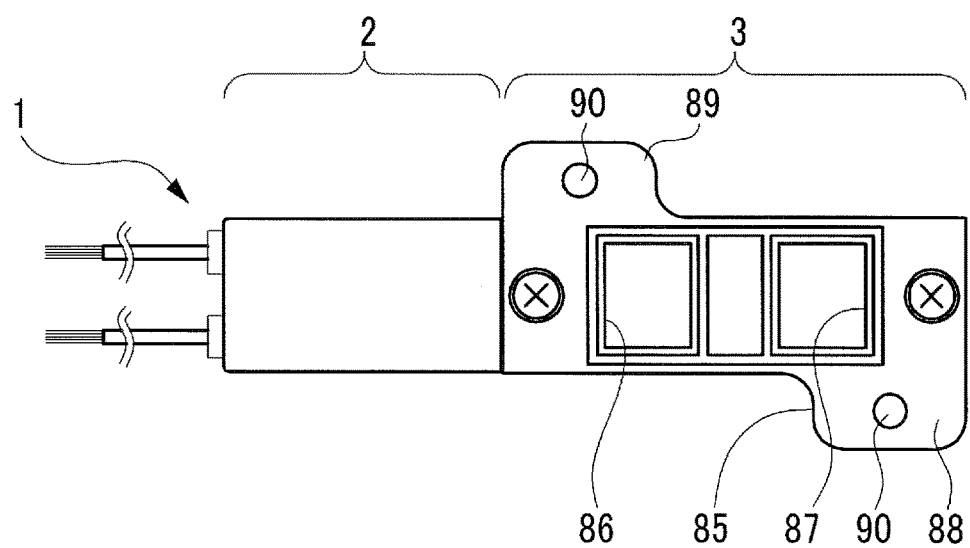

Next, a pilot type solenoid valve 1 in a fourth embodiment will be explained below. FIG. 11A is a front view of the pilot type solenoid valve 1 in the fourth embodiment. FIG. 11B is a bottom view of the valve 1 shown in FIG. 11A. The fourth embodiment is different from the third embodiment in only the shape of a mounting plate 85, so only those different parts will be explain below.

In the present embodiment, the mounting plate 85 has mounting portions 88 and 89 each projecting in mutually opposite directions. Each of the mounting portions 88, 89 is formed with a mounting screw hole 90. An inlet port 86 and an outlet port 87 are provided in the surface (a lower surface in FIG. 11A) of the passage block unit 3, perpendicular or at right angle to the surface attached with the pilot valve unit 2. According to this configuration, there are advantages that the whole height including the manifold can be low, and the height in horizontal direction of the solenoid valve 1 in FIG. 11 can be short.

Next, a pilot type solenoid valve 1 in a fifth embodiment will be explained below. FIG. 12A is a front view of the pilot type solenoid valve 1 in the fifth embodiment. FIG. 12B is a bottom view of the valve 1 shown in FIG. 12A. The fifth embodiment is different from the fourth embodiment in only a connection structure of an inlet port and an outlet port, so only those different parts will be explain below.

In the fourth embodiment, the pilot type solenoid valve 1 is intended to be directly attached to a manifold block. On the other hand, in the fifth embodiment, one-touch joints 91, and 92 are attached to the passage block unit 3. Accordingly, users can connect the one-touch joints 91 and 92 to tubes in use.

Figure 13:
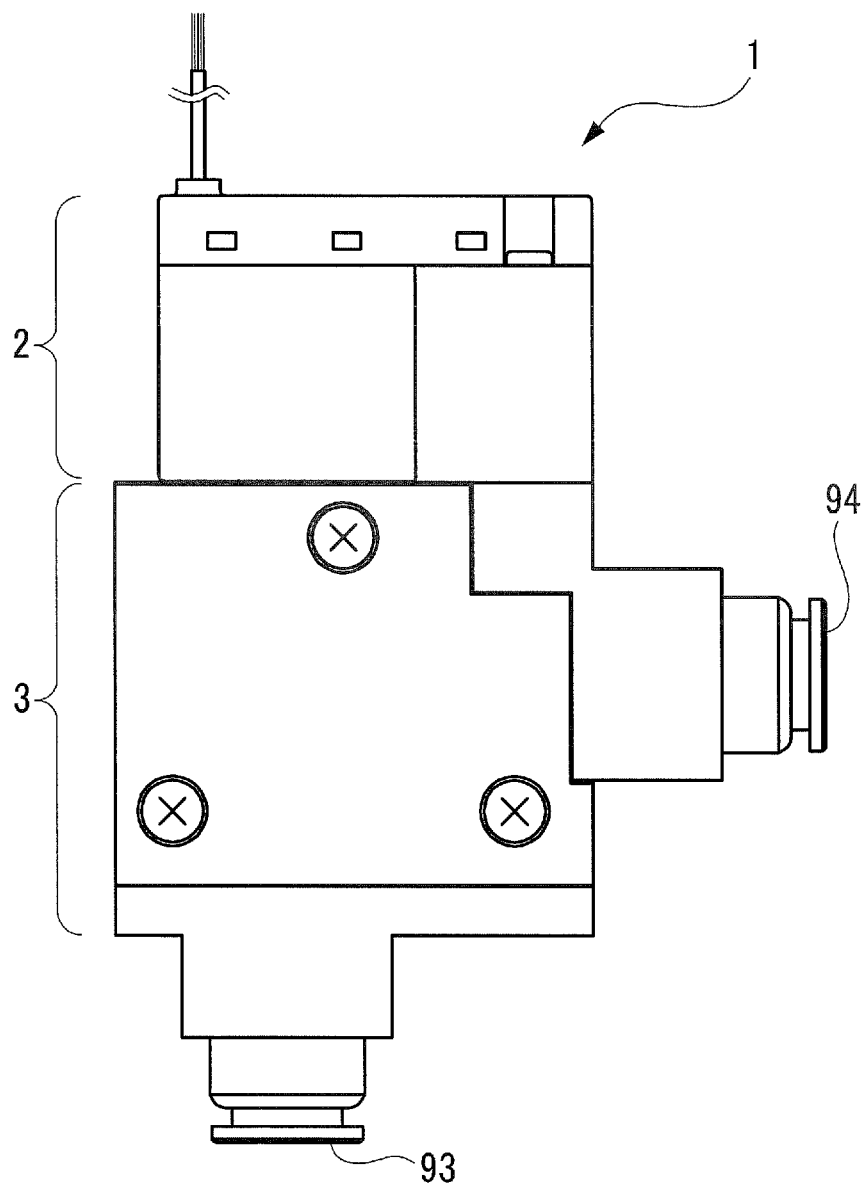
FIGS. 13 is a front view of a pilot type solenoid valve in a sixth embodiment of the invention.

Next, a pilot type solenoid valve 1 in a sixth embodiment will be explained below. FIG. 13 is a front view of the pilot type solenoid valve 1 in the sixth embodiment. The sixth embodiment is different from the second embodiment in only a position of an inlet port and an outlet port, so only those different parts will be explained. In the sixth embodiment, an inlet one-touch joint 94 is provided on a surface (a right surface in FIG. 13) of the passage block unit 3, perpendicular or at right angle to a mounting surface mounted thereon with the pilot valve unit 2. An outlet one-touch joint 93 is provided on a surface (a lower surface in FIG. 13) opposite to the mounting surface mounted thereon with the pilot valve unit 2. An inlet port is formed in the surface (the right surface) provided with the inlet one-touch joint 94, and an outlet port is formed in the surface (the lower surface) provided with the outlet one-touch joint 93.

According to the above configuration, the inlet port and the outlet port are formed in the different surfaces, so that pipes or tubes can be connected in separated or dispersed locations to the passage block unit 3. This pipe arrangement enables easy piping work and also provides convenience during maintenance. Also, the above configuration makes it easy to connect the passage block unit 3 (the solenoid valve 1) to other devices and provides dispersed pipe arrangement. This pipe arrangement enables easy piping work and also provides convenience during maintenance.

Figure 14:
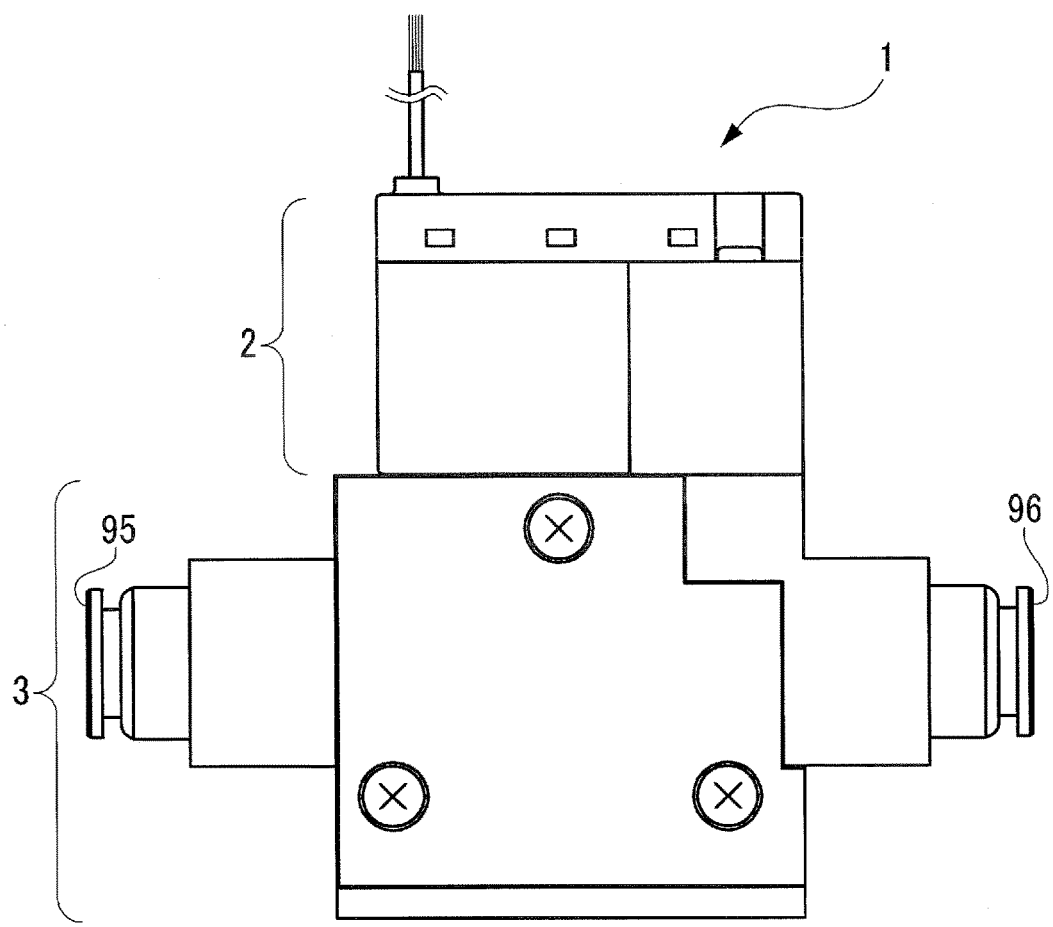
FIG. 14 is a front view of a pilot type solenoid valve in a seventh embodiment of the invention.

Next, a pilot type solenoid valve 1 in a seventh embodiment will be explained below. FIG. 14 is a front view of the pilot type solenoid valve 1 in the seventh embodiment. The seventh embodiment is different from the sixth embodiment in only a position of an inlet port and an outlet port, so only those different parts will be explained.

In the seventh embodiment, an inlet one-touch joint 96 is provided in a surface (a right surface in FIG. 14) of the passage block unit 3, perpendicular or at right angle to a surface mounted thereon with the pilot valve unit 2, and an outlet one-touch joint 95 is provided in a surface (a left surface in FIG. 14) opposite to the surface provided with an inlet one-touch joint 96.

According to the above configuration, when a remaining one surface of the passage block unit 3 is used as a surface for mounting the solenoid valve 1 to a manifold, an inlet port (96) and an outlet port (95) can be arranged in line as in a conventional pilot type solenoid valve.

Next, a pilot type solenoid valve 1 in an eighth embodiment will be explained below. In the eighth embodiment, four pilot type solenoid valves (1A, 1B, 1C, and 1D) each corresponding to the solenoid valve 1 of the third embodiment are connected to a manifold block 101. The pilot type solenoid valves 1A, 1B, 1C, and 1D respectively include pilot valve bodies 2A, 2B, 2C, and 2D and passage block units 3A, 3B, 3C, and 3D.

Figure 15:
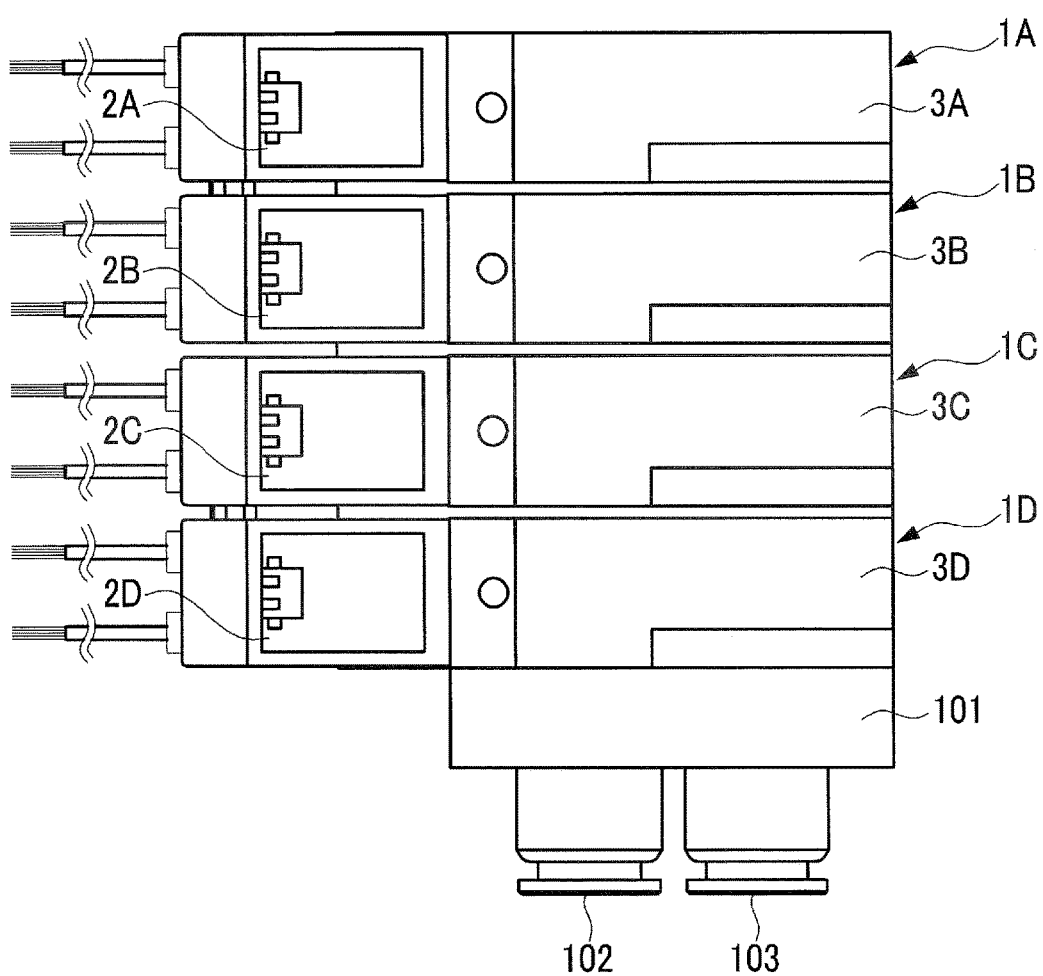
FIG. 15 is a front view of a pilot type solenoid valve manifold in an eighth embodiment of the invention.
Figure 16:
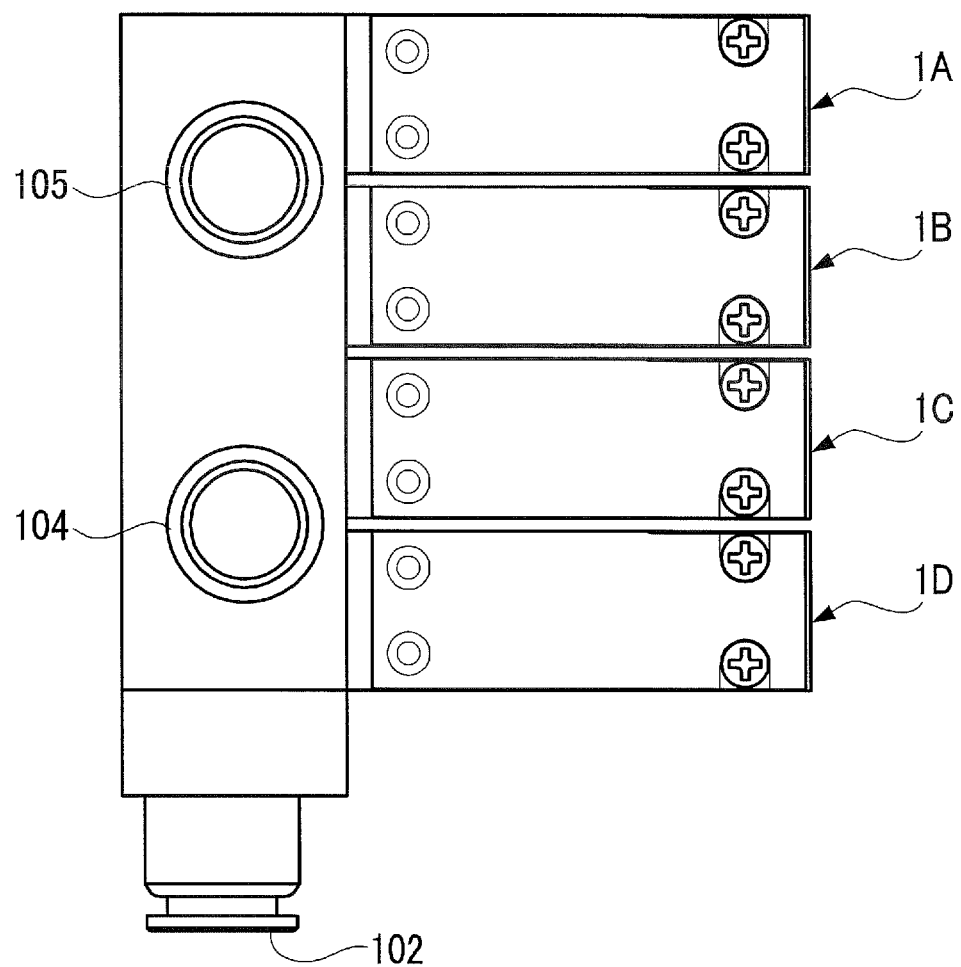
FIG. 16 is a left side view of the pilot type solenoid valve shown in FIG. 15.
Figure 17:
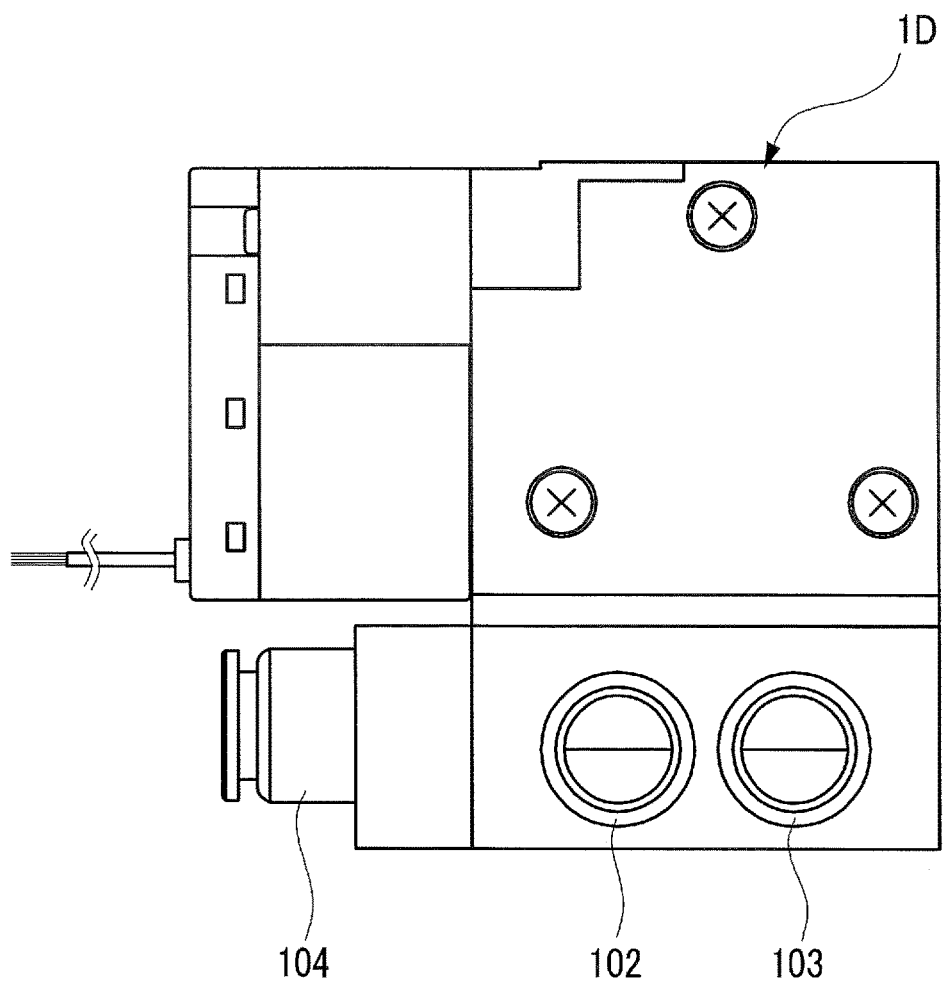
FIG. 17 is a bottom view of the pilot type solenoid valve shown in FIG. 15.
Figure 18:
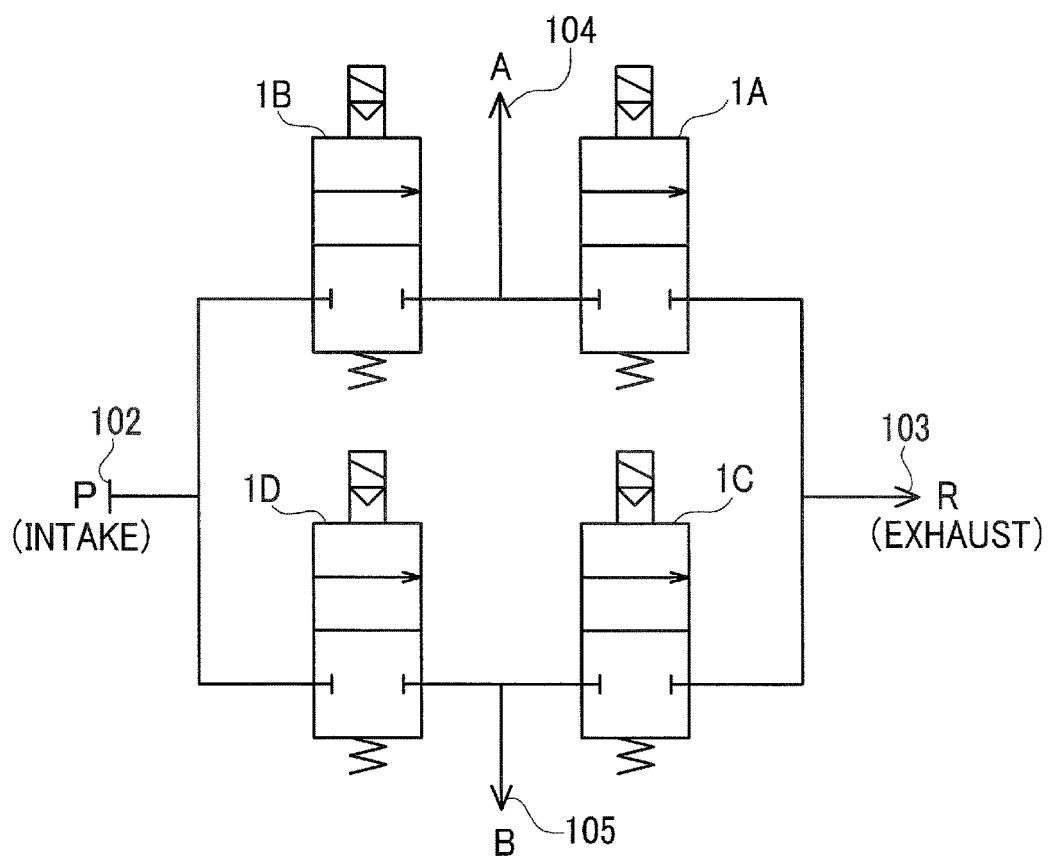
FIG. 18 is a circuit diagram of a pilot type solenoid valve manifold in the eighth embodiment of the invention.

FIG. 15 is a front view of the pilot type solenoid valves 1A-1D in the eighth embodiment. FIG. 16 is a left side view of the solenoid valves 1A-1D shown in FIG. 15, and FIG. 17 is a bottom view of the same shown in FIG. 15. FIG. 18 is a circuit diagram of the solenoid valves 1A-1D in the eighth embodiment.

As shown in FIG. 18, intake air flowing in an inlet port 102 is divided into two flows, one flowing to the solenoid valve 1D and the other flowing to the solenoid valve 1B. An output path of the solenoid valve 1D is divided into two, one being connected to an inlet port of the solenoid valve 1C and the other being connected to a third outlet port 105. An output path of the solenoid valve 1B is divided into two, one being connected to an inlet port of the solenoid valve 1A and the other being connected to a second outlet port 104.

As shown in FIG. 15, on an upper surface of the manifold block 101, there are arranged the pilot type solenoid valves 1A, 1B, 1C and 1D from above.

One-touch joints of an inlet port 102 and a first outlet port 103 are provided in a lower surface of the manifold block 101. One-touch joints of a second outlet port 104 and a third outlet port 105 are provided in a left side surface of the manifold block 101.

According to the above configuration, a thickness of each of the pilot type solenoid valves 1A, 1B, 1C, and 1D is as thin as 10 mm, for example, so that the whole size of the solenoid valves assembled with a manifold can be compact.

The present invention may be embodied in other specific forms without departing from the essential characteristics thereof.

While the presently preferred embodiment of the present invention has been shown and described, it is to be understood that this disclosure is for the purpose of illustration and that various changes and modifications may be made without departing from the scope of the invention as set forth in the appended claims.

REFERENCE SINGS LIST

1 Pilot type solenoid valve
2 Pilot valve body
3 Passage block unit
14 Common passage
18 Movable core
22 Fixed core
30 Flat cover
32 Flat cover communication path
33 Metal ball
35 Recess
40 Block body
41 Valve hole chamber
42 Outlet passage
43 Valve chamber
44 Inlet passage
55 Valve seat
58 Shielding wall
60 Diaphragm valve element

What is claimed is:

1. A pilot type solenoid valve including:
a pilot valve unit having a fixed core and a movable core; and
a passage block unit formed with a valve seat with which a valve element will come into or out of contact; wherein
the passage block unit has a rectangular parallelepiped shape including a pair of wide opposite surfaces and four side surfaces surrounding the wide opposite surfaces,
the four side surfaces include a first surface on which the pilot valve unit is attached, and a second surface formed with an input port and an output port,
the valve element is a diaphragm valve and arranged in parallel to the pair of wide opposite surfaces,
the passage block unit includes a block body forming a valve chamber around the valve seat, and a flat cover of a flat plate shape,
the block body includes:
the valve chamber having a cylindrical shape, divided by the diaphragm valve,
the valve seat located at a center of a first bottom of the valve chamber, the first bottom facing the diaphragm valve,
a valve hole chamber provided with a second bottom on a side of the valve hole chamber opposite to an opening of the valve seat,
an inlet passage allowing communication between the valve chamber and the input port, and
an outlet passage allowing communication between the valve hole chamber and the output port,
the inlet passage extends along a direction of a tangent to the valve chamber, and
the outlet passage communicates with an end portion of the second bottom on an opposite side to the inlet passage with respect to the valve hole chamber,
the inlet passage and the outlet passage extend in parallel with each other,
when seen in a section taken in a direction perpendicular to the outlet passage and along a central axis of the valve chamber, the inlet passage has a square cross-sectional shape formed to overlap with the first bottom of the valve chamber, and the outlet passage has a rectangular cross-sectional shape formed to overlap with the second bottom of the valve hole chamber, and
a bottom surface of the inlet passage, the second bottom of the valve hole chamber, and a bottom surface of the outlet passage lie in a same plane.

2. The pilot type solenoid valve according to claim 1, wherein the second surface and the first surface are opposite each other.

3. The pilot type solenoid valve according to claim 1, wherein the second surface and the first surface are at right angles to each other.

* * * * *